（12）United States Patent
Arden et al.

(10) Patent No.: US 8,062,137 B2
(45) Date of Patent: Nov. 22, 2011

(54) CONSTANT VELOCITY JOINT WITH TORQUE OVERLOAD PROTECTION

(75) Inventors: Tony N. Arden, Davisburg, MI (US); Samuel J. Oram, Rochester Hills, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 332 days.

(21) Appl. No.: 12/357,951

(22) Filed: Jan. 22, 2009

(65) Prior Publication Data

US 2009/0186706 A1    Jul. 23, 2009

Related U.S. Application Data

(60) Provisional application No. 61/022,771, filed on Jan. 22, 2008.

(51) Int. Cl.
*F16D 7/02*    (2006.01)

(52) U.S. Cl. .......................................... 464/46; 464/906

(58) Field of Classification Search ..................... 464/10, 464/30, 45, 46, 139–146, 47, 48, 906; 192/56.6
See application file for complete search history.

(56) References Cited

U.S. PATENT DOCUMENTS

| | | | | |
|---|---|---|---|---|
| 1,739,947 A | * | 12/1929 | Chilton | 464/46 |
| 2,337,902 A | * | 12/1943 | Lakin | 464/46 |
| 2,605,850 A | * | 8/1952 | Kiehaefer | 464/45 |
| 2,753,703 A | * | 7/1956 | McIntyre | 464/46 |
| 2,943,466 A | * | 7/1960 | Elliott | 464/47 |
| 2,977,779 A | * | 4/1961 | Steinke et al. | 464/48 |
| 5,092,440 A | * | 3/1992 | Nakano | 464/47 |
| 5,927,456 A | | 7/1999 | Monahan et al. | |
| 6,023,923 A | | 2/2000 | McLean et al. | |
| 6,116,009 A | | 9/2000 | McLean et al. | |
| 6,336,537 B1 | | 1/2002 | Krisher et al. | |
| 6,408,973 B1 | | 6/2002 | Beesley et al. | |
| 7,104,374 B2 | | 9/2006 | Takashi et al. | |

FOREIGN PATENT DOCUMENTS

| | | |
|---|---|---|
| JP | 2004232836 | 8/2004 |
| JP | 2005114114 | 4/2005 |
| JP | 2005114125 | 4/2005 |

OTHER PUBLICATIONS

English language abstract for JP 2004232836.
English language abstract for JP 2005114114.
English language abstract for JP 2005114125.

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC

(57) ABSTRACT

An exemplary constant velocity joint includes a first member and a second member rotatably engaging the first member. A clutch pack is disposed between and engages the first and second members. A fastener is used to attach the first member to the second member. The fastener is fixedly connected to the second member and rotatably engages the first member. The fastener exerts a biasing force for urging the first and second members into engagement with the clutch pack.

8 Claims, 3 Drawing Sheets

CONSTANT VELOCITY JOINT WITH TORQUE OVERLOAD PROTECTION

CROSS REFERENCE TO RELATED APPLICATIONS

This application claims priority to U.S. Provisional Patent Application 61/022,771, filed Jan. 22, 2008, which is incorporated by reference in its entirety.

BACKGROUND

Constant velocity joints connecting shafts to drive units are common components in vehicles. The drive unit typically has an output shaft or an input shaft for receiving the joint. Typically, the drive unit is an axle, transfer case, transmission, power take-off unit, or other torque device, all of which are common components in automotive vehicles. Typically, one or more joints are assembled to the shaft to form a propeller or drive shaft assembly. It is the propeller shaft assembly which is connected, for instance, at one end to the output shaft of a transmission and, at the other end, to the input shaft of a differential. The shaft may be solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Optionally, the joint may be coupled to a shaft for torque transfer utilizing a direct torque flow connection.

In many off road vehicle environments considerable torque is applied through the constant velocity joint. All terrain vehicles and utility vehicles often have drivelines that are subject to intermittent high torque values during unusual or extreme operating conditions. Such operating conditions may arise, for example, when the vehicle lands after jumping off irregular terrain. The impact upon landing generates considerable torque in the drivelines. This torque is subsequently imparted into the individual components of the constant velocity joint as the wheels of the vehicle regain traction. When the torque imparted into the constant velocity joint components exceeds design considerations, the components can experience failure. A common design response to these extreme conditions has been to increase the size of the CV joint components in order to increase their maximum torque weathering capacity.

In addition to the extreme conditions, designers are utilizing higher capacity engines in vehicle designs. These higher capacity engines increase the power passed through the drivelines and therefore increase the overload torques experienced during extreme conditions. Existing methods of compensation require continued upsizing of the drivelines in order to accommodate the increased power and resulting increased overload torques. Continued upsizing, however, results in increases in mass of the driveline components with subsequent mass increases to the vehicle itself. Upsizing, therefore, poses undesirable restrictions on vehicle designers.

DETAILED DESCRIPTION

Figure 1:
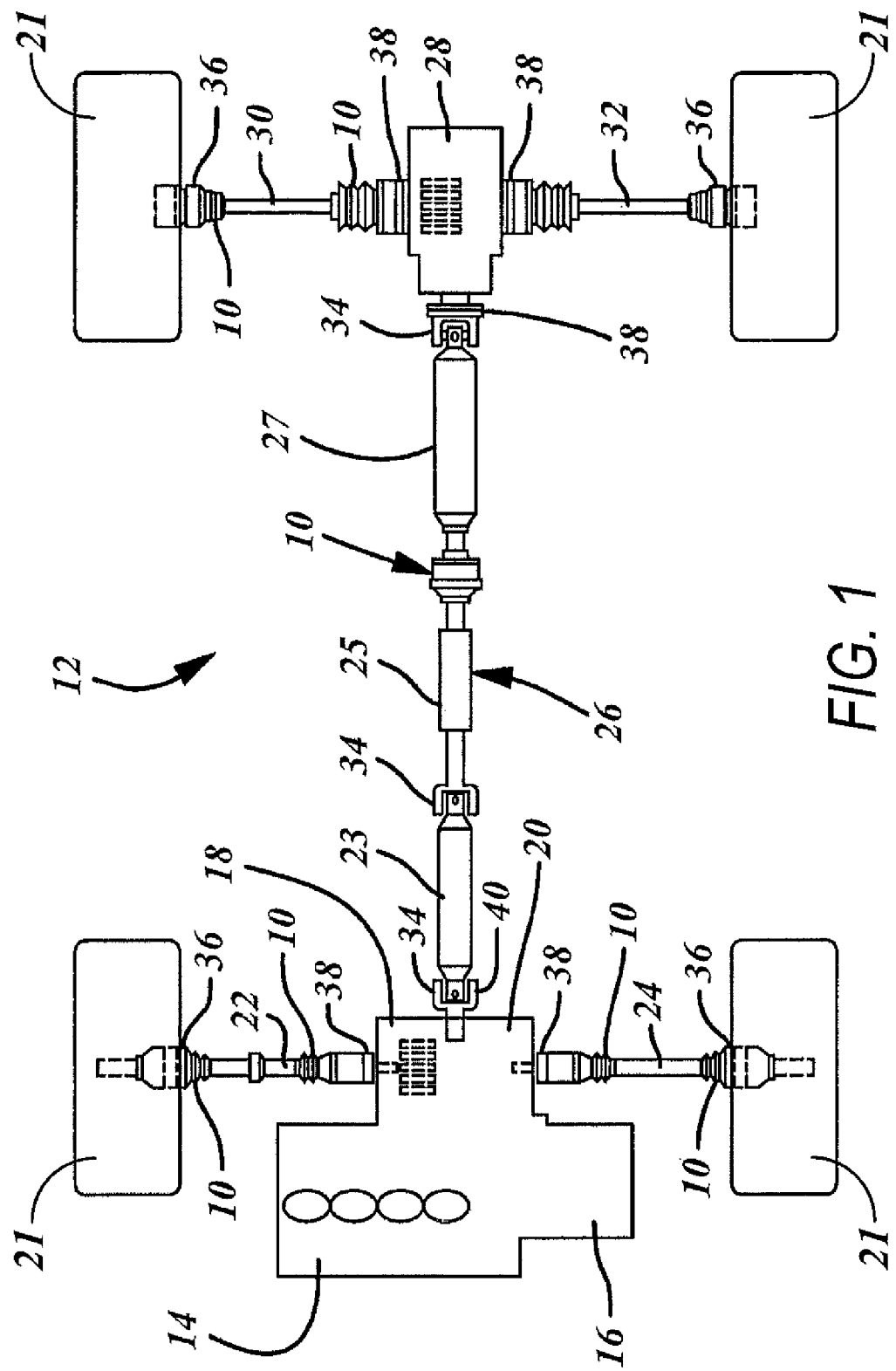
FIG. 1 is a plan view of an exemplary drive system for a typical four-wheel drive vehicle employing an exemplary constant velocity joint having torque overload protection.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

While the invention is described with respect to a constant velocity universal joint with torque overload protection for use in an all-terrain vehicle, the following apparatus is capable of being adapted for various purposes including automotive vehicles drive axles, motor systems that use a propeller shaft, or other vehicles and non-vehicle applications that require shaft assemblies for torque transmission.

An exemplary drive system 12 for a typical four-wheel drive vehicle is shown in FIG. 1. While a 4-wheel drive system is shown and described, the concepts herein presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24, each of which are connected to a wheel 21 and deliver power to the wheels. Attached to the ends of the right hand side half shaft 22 and left hand side half shaft 24 are constant velocity joints 10.

A propeller shaft 26 connects the front differential 20 to a rear differential 28. The rear differential 28 includes a rear right hand side shaft 30 and a rear left hand side shaft 32. Attached to each side shaft 30, 32 is a wheel 21. Constant velocity joints 10 may be attached to the ends of the half shafts 30, 32 that connect to the wheels 21 and the rear differential 28.

The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles, such as may occur due to steering and/or raising or lowering of the suspension of the vehicle.

The constant velocity joints 10 may have any of a variety of configurations, such as a plunging tripod, a cross groove joint, a fixed ball joint, a fixed tripod joint, or a double offset joint, to name a few. The constant velocity joints 10 allow for transmission of constant velocities at angles typically encountered in the off road travel of all-terrain vehicles in both the half shafts, interconnecting shafts and propeller shafts of these vehicles. Optionally, each Cardan joint 34 may be replaced with any other suitable type of joint, including constant velocity joint types. The constant velocity universal joint with torque overload protection may be utilized for any of the above mentioned joint locations.

The shafts 22, 23, 24, 25, 27, 30, 32 may have a variety of configurations, such as solid or tubular with ends adapted to attach each shaft to an inner race or an outer race of a joint, thereby allowing the outer race or inner race to be connected to a hub connector 36, a flange 38, or stubshaft 40, of each drive unit, as appropriate for the particular application. Thus, any of the connections identified in FIG. 1 at 10 or 34 may employ a constant velocity universal joint with torque overload protection.

Figure 2:
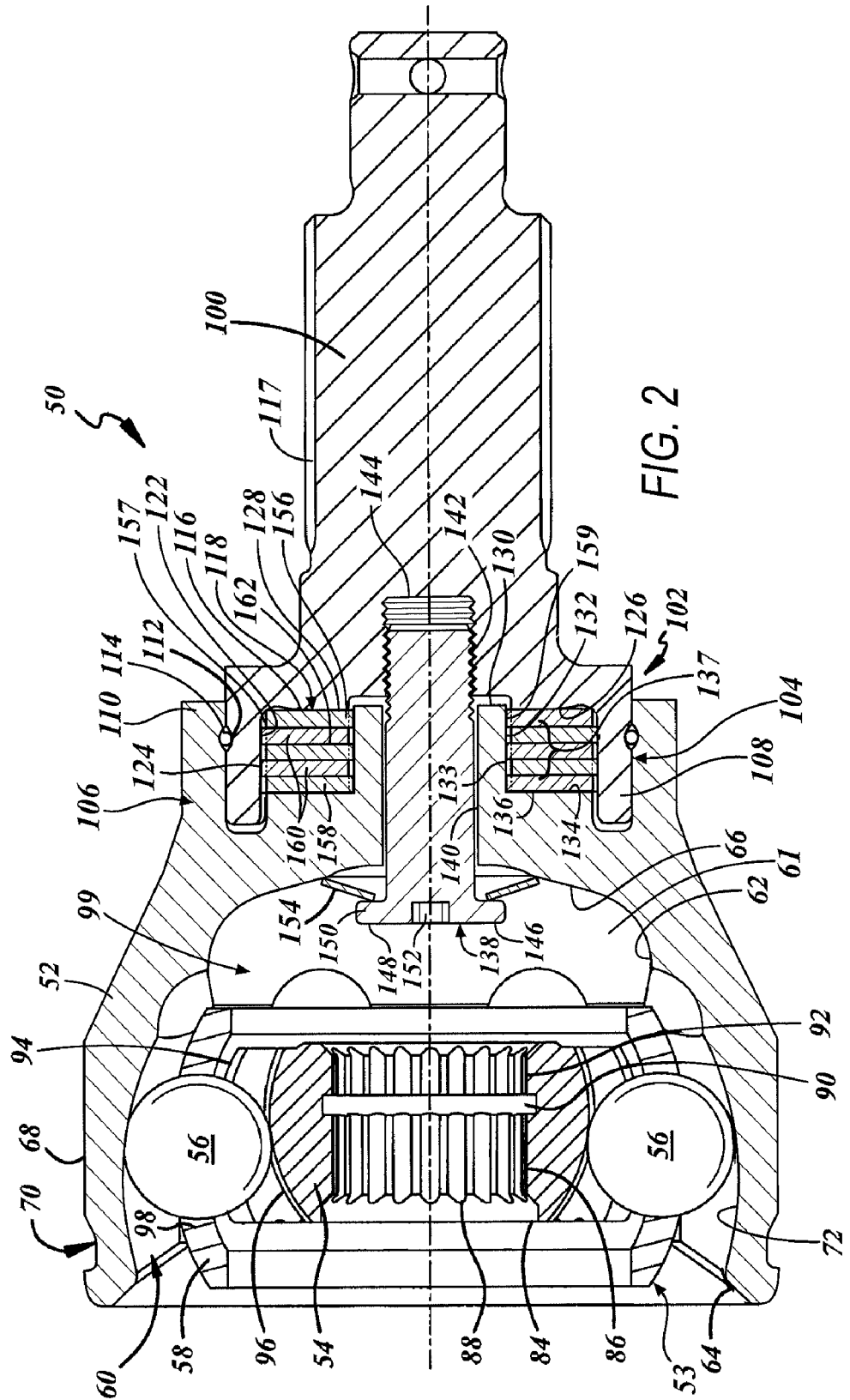
FIG. 2 is a partial cross-sectional view of the exemplary constant velocity joint employing a clutch pack having an outer circumference attached to a joint stem and an inner circumference attached to a joint housing.

Referring now to FIG. 2, an exemplary constant velocity universal joint with torque overload protection 50 is illustrated. The constant velocity joint 50 may include a housing 52 configured to support a bearing 53. The housing 52 may be configured to engage a propeller shaft. Bearing 53 may include an inner bearing race 54 configured to engage a journal of a drive unit and a plurality of torque transmitting balls 56 positioned between inner bearing race 54 and housing 52. It should be understood that the constant velocity joint 50 may also be configured such that the housing 52 engages a drive unit and the inner bearing race 54 engages a propeller shaft. A ball cage 58 may be positioned between the housing 52 and inner race 54, and retains the plurality of torque transmitting balls 56.

The housing 52 may include a semi-spherical internal bore 60 forming a bearing cavity 61 in which bearing 53 is disposed. Bearing cavity 61 is at least partially defined by an inner surface 62, a conical opening 64 disposed adjacent inner surface 62, and an opposed rear-internal surface 66. Located on an outer surface 68 of the housing 52 is at least one circumferential channel 70 extending around the entire outer periphery of the housing 52. A boot or another protective cover may be secured to the channel to prevent dirt and contaminants from entering the bearing cavity. The housing 52 may generally be made of a steel material, however, it should be noted that any other type of metal material, hard ceramic, plastic, or composite material, to name a few, may also be used for the housing 52. It is desirable that the selected material be capable of withstanding the high speeds, temperatures and contact pressures of the constant velocity joint 50 for extended periods.

The housing 52 may also include a plurality of axially opposed outer ball tracks 72 located on the inner surface 62 thereof. The tracks 72 form a generally spherical shaped path within the inner surface 62 of the housing 52. The tracks 72 may be axially opposed, such that one half of the outer ball tracks 72 open to a side of the housing 52 opposite to that of the other half of the outer ball tracks 72 in any number of patterns. Depending on the configuration of the constant velocity joint, the ball tracks all may open or axially align on the same side of the outer race. The outer ball tracks 72 may also be of a gothic or elliptical shape provided the pressure angle and conformity are maintained, or may have other configurations depending on the requirements of the particular application. The outer ball tracks 72 located on the inner surface 62 of the housing 52 may also be double offset tracks. Further, it is to be understood that the constant velocity joint 50 may be a fixed constant velocity joint, including without limitation a VL, RF, AC, DO, or a tripod joint including other fixed constant velocity joints.

The inner bearing race 54 generally has a circumferential shape. The inner bearing race 54 is arranged within the bore 60 of the housing 52. The inner bearing race 54 includes a drive unit side 84, an inner joint bore 86 that includes a plurality of splines 88, and a circlip groove 90 on the inner surface 92 thereof, for axially retaining the constant velocity joint in a rotationally fixed way to a driveshaft. It should be understood, however, that axial retention of the inner bearing race 54 to a shaft may also be accomplished in other ways.

An outer surface 94 of the inner bearing race 54 may include a plurality of inner ball tracks 96 that may be axially opposed. The inner ball tracks 96 generally have a spherical shape and are aligned radially with the ball tracks 72 on the housing 52, such that the axial angle will open in a similar or the same direction as the ball track 72 directly aligned above it on the housing 52. The inner bearing race 54 may be made of steel, or another material, such as a metal composite, hard plastic, and ceramic, to name a few.

The ball cage 58 generally has a ring-like configuration. The ball cage 58 is arranged within the bore 60 of the housing 52 such that it is not in contact with the inner surface of the housing 54. The cage 58 has a plurality of oblong-shaped orifices or windows 98 that extend through the cage. The number of windows 98 may match the number of ball tracks 72, 96 on the housing 52 and inner bearing race 54 of the constant velocity joint 50. The number of balls and windows may, however, differ. The cage 58, along with the inner bearing race 54, may be made of a steel material, but any other hard metal material, plastic, composite, or ceramic, to name a few, may also be used.

The balls 56 are each arranged within a separate orifice 98 of the cage 58 and within a ball track 72, 96 of the housing 52 and the inner bearing race 54, respectively. Therefore, the balls 56 will be capable of rolling in the axially opposed tracks 72, 96 aligned in the same direction. It is contemplated that a pocket region 99 may be formed between the outer ball tracks 72 and the rear internal surface 66. The pocket region 99 may be configured to provide clearance for the inner bearing race 54 during angled positioning.

Attached to the housing 52 is a stem 100 having a housing engagement end 102. The stem 100 includes a connector 104 arranged at the housing engagement end 102 of the stem 100 for attaching the stem to the housing 52. The housing 52 includes a correspondingly configured connector 106 that slidably engages the connector 104 of the stem 100. The connector 104 of the stem 100 may include a cylindrical shaped region 108. A longitudinal axis of the cylindrically shaped region 108 substantially coincides with a longitudinal axis of the stem 100. The connector 106 of the housing 52 similarly includes a cylindrical shaped region 110 having a longitudinal axis that substantially coincides with a longitudinal axis of the bearing 53. The cylindrical region 110 of the housing 52 engages the cylindrical region 108 of the stem 100 when the two members are interconnected. The connector 104 of the stem 100 has a diameter sized smaller than a diameter of the connector 106 of the housing 52 to enable the two members to rotate relative to one another when connected. With the stem 100 attached to the housing 52, the bearing 53, the housing 52, and the stem 100 are aligned substantially along a common axis. A stem o-ring channel 112 and an o-ring element 114 may be used to axially seal the stem 100 within the housing 52.

Also arranged at the housing engagement end 102 of the stem 100 is a recessed region 116 configured to receive a clutch pack 118. The stem recessed region 116 may include a generally cylindrical sidewall 122 having a longitudinal axis that substantially coincides with the longitudinal axis of the stem 100. The sidewall 122 engages an outer circumference 124 of the clutch pack 118. A rear wall 126 of the recessed region 116 is arranged generally perpendicular to the longitudinal axis of the stem 100 and engages a side 128 of the clutch pack 118.

The housing 52 may include a cylindrically shaped clutch mounting flange 130. An outer circumferential surface 132 of the flange 130 engages an inner diameter of the clutch pack 118. Extending generally radially outward from the flange 130 is a housing surface 134 that engages a side 136 of the clutch pack 118 that is opposite the side 128. With the stem 100 connected to the housing 52, the cylindrical sidewall 122 and rear wall 126 of the recessed region 116 of the stem 100, and the outer surface 132 of the clutch mounting flange 130 and the sidewall 134 of the housing 52, together define a clutch chamber 137 in which the clutch pack 118 is disposed.

The stem 100 may be secured to the housing 52 by means of a fastener 138. The fastener 138 extends through a bore 140 in the housing 52. The housing 52 is free to rotate about the fastener 138. The fastener 138 may include a threaded end 142 that engages a correspondingly threaded aperture 144 in the stem 100. An opposite end 146 may include a head 148 configured to enable torque to be applied to the fastener 138. For example, the fastener head 148 may include an external hex 150 that can be engaged with an appropriately sized socket wrench, or may include a recessed socket 152 configured to receive a suitably configured key, such as a hex key or Torx™ wrench. The head 148 of the fastener 138 is disposed within the bearing cavity 61 and may be accessed through the bore 86 of the inner bearing race 54.

A biasing member 154 may be disposed between the rear internal surface 66 of the bearing housing 52 and an underside of the fastener head 148. The biasing member 154 may include, but is not limited to, a coil spring, wave spring, leaf spring, ring of elastic material, as well as other types of biasing devices. The biasing member 154 produces a biasing force that tends to draw the stem 100 and the housing 52 toward one another, thereby causing the housing 52 and the stem 100 to exert a compressive force on the clutch pack 118. The magnitude of the compressive force applied to the clutch pack 118 can be selectively controlled by adjusting how far the end 142 of the fastener 138 is threaded into the threaded aperture 144 of the stem 100.

Although a variety of clutch packs 118 and attachment configurations are contemplated, one exemplary configuration contemplates the use of a plurality of slip clutch plates 156 held in compression between the stem 100 and the housing 52. Each clutch plate 156 is splined either at the inner diameter of the plate or the outer diameter of the plate. The clutch plate spline engage a corresponding spline 157, 159 formed on the cylindrical side wall 124 of the recessed region 116 of the stem 100 and surface 132 of clutch mounting flange 130, respectively. Generally the clutch plates 156 are arranged such that every other clutch plate is splined at the inner diameter, for example clutch plates 158 are splined at the inner diameter, and the intermediate plates 160 are splined at the outer diameter. The clutch plates 156 may be slid axially relative to the stem 100 and housing 52, but are prevented from rotating relative to the housing or the stem, depending on which component the clutch plate is splined. The torque transfer path through the constant velocity joint 50 travels from the spline 88 located in the bore 86 of the inner bearing race 54, through torque transmitting balls 56 to housing 52, at which point the torque is transmitted to the clutch plate 158 splined at the inner diameter to the housing 52, across a clutch plate interface 162 to the adjoining clutch plate 160 that is splined at the outer diameter to the stem 100, and ending at the spline 117.

The fastener 138 may be utilized to set a torque threshold of the clutch pack 118. When the fastener 138 is tightened, the compression force being applied by the housing 52 and the stem 100 on the clutch pack 118 increases, thereby producing a corresponding increase in the torque threshold. Conversely, loosening fastener 138 reduces the compression on the clutch pack 118, and the corresponding torque threshold is reduced. The biasing member 154 disposed between the head 148 of the fastener 138 imparts a generally constant axial compressive load on the clutch plates 156 of the clutch pack 118. The fastener 138 may be installed and pre-tensioned prior to assembly of the inner bearing race 54 into the housing 52. The fastener 138 tension may also be set through the inner joint bore 86 after assembly.

The clutch pack 118 is disposed within the clutch chamber 137 and engages the outer race stem 100 and the housing 52. The clutch pack 118 is configured such that the outer race stem 100 and the housing 52 rotate in unison below a pre-set overload torque value. When the overload torque reaches a predetermined threshold, the designed frictional resistance of the plurality of slip clutch plates 156 is overcome and independent rotation is allowed. Once the overload torque value threshold is crossed, the outer race stem 100 and the housing 52 are allowed to rotate independently, thereby preventing damaging torque from being imparted into the constant velocity joint 50 internal components. When the torque values drop below the overload threshold, the clutch pack 118 re-engages and the outer race stem 100 and housing 52 resume rotating in unison.

Figure 3:
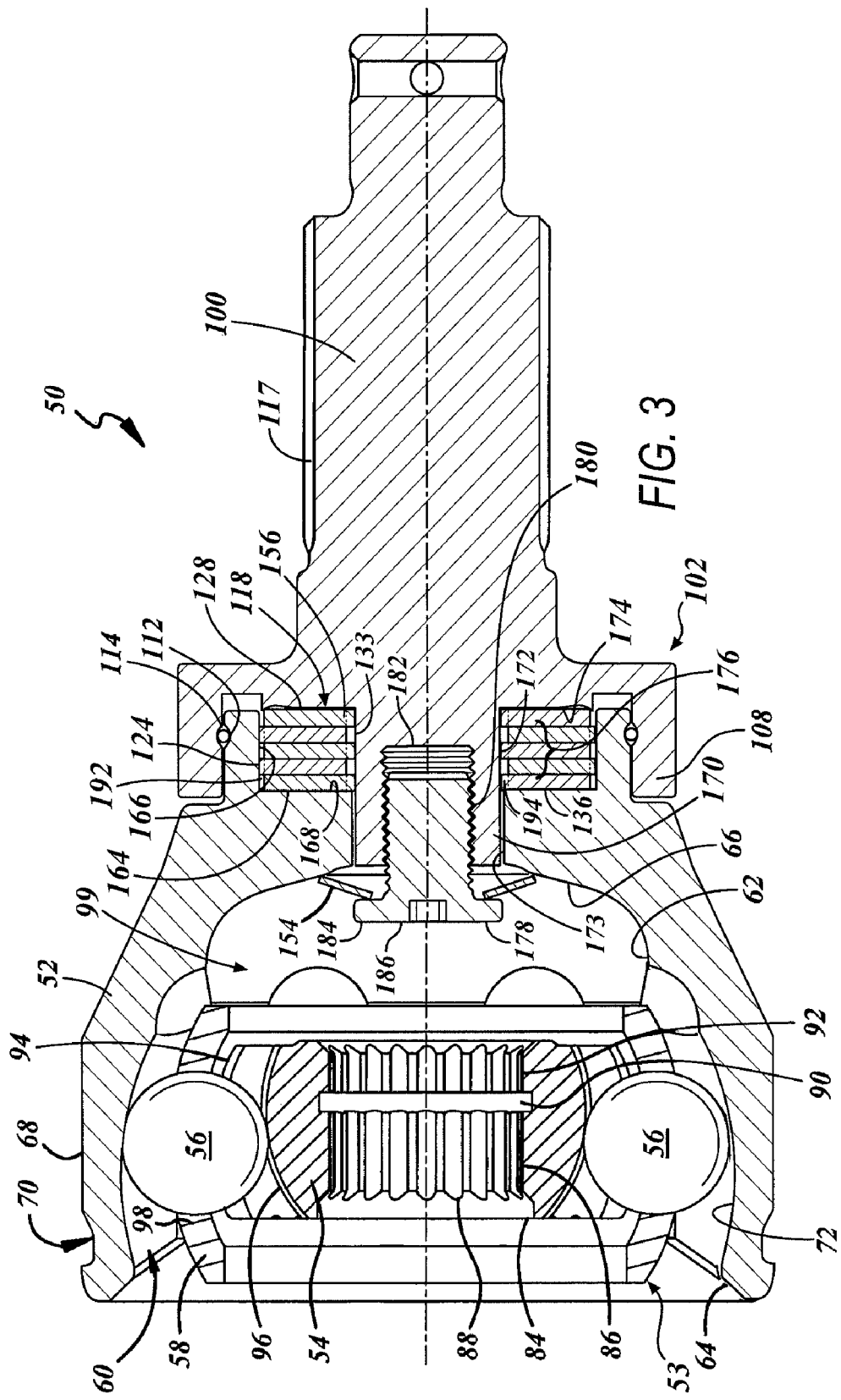
FIG. 3 is a partial cross-sectional view of the exemplary constant velocity joint employing a clutch pack having an inner circumference attached to the joint stem and an outer circumference attached to the joint housing.

With reference to FIG. 3, housing 52 and stem 100 may be configured such that the outer circumference 124 of the clutch pack 118 engages the housing and the inner circumference 133 of the clutch pack 118 engages the stem. Housing 52 includes a recessed region 164 configured to receive the clutch pack 118. The housing recessed region 164 may include a generally cylindrical sidewall 166 having a longitudinal axis that substantially coincides with the longitudinal axis of the bearing 53. The sidewall 166 engages the outer circumference 124 of the clutch pack 118. A rear wall 168 of the recessed region 164 is arranged generally perpendicular to the longitudinal axis of the bearing 53 and engages the side 136 of the clutch pack 118.

The stem 100 may include a cylindrically shaped clutch mounting flange 170. An outer circumferential surface 172 of the flange 170 engages the inner diameter 133 of the clutch pack 118. The clutch mounting flange 170 extends through a bore 173 in the housing 52. The housing 52 is free to rotate about the clutch mounting flange 170. Extending generally radially outward from the flange 170 is a stem side wall 174 that engages the side 128 of the clutch pack 118 that is opposite the side 136. With the stem 100 connected to the housing 52, the cylindrical sidewall 166 and rear wall 168 of the recessed region 164 of the stem 100, and the outer surface 172 of the clutch mounting flange 170 and the sidewall 174 of the stem 100, together define a clutch chamber 176 in which the clutch pack 118 is disposed.

The stem 100 may be secured to the housing 52 my means of a fastener 178. The fastener 178 may include a threaded end 180 that engages a correspondingly threaded aperture 182 in the stem 100. An opposite end 184 may include a head 186 configured to enable torque to be applied to the fastener 178. For example, the fastener head 186 may include an external hex 188 that can be engaged with an appropriately sized socket wrench, or may include a recessed socket 190 configured to receive a suitably configured key, such as a hex key or Torx™ wrench. The head 186 of the fastener 178 is disposed within the bearing cavity 61 and may be accessed through the bore 86 of the inner bearing race 54.

A biasing member 154 may be disposed between the rear internal surface 66 of the bearing housing 52 and an underside of the fastener head 186. The biasing member 154 may include, but is not limited to, a coil spring, wave spring, leaf spring, ring of elastic material, as well as other types of biasing devices. The biasing member 154 produces a biasing force that tends to draw the stem 100 and the housing 52 toward one another, thereby causing the housing 52 and the stem 100 to exert a compressive force on the clutch pack 118. The magnitude of the compressive force applied to the clutch pack 118 can be selectively controlled by adjusting how far the end 180 of the fastener 178 is threaded into the threaded aperture 182 of the stem 100.

The clutch pack 118 may be attached to the housing 52 and the stem 100 in a similar manner as previously described with respect to the configuration illustrated in FIG. 2. For example, each of the clutch plates 156 may be splined either at the inner diameter of the plate or the outer diameter of the plate. The clutch plate spline engages a corresponding spline 192, 194 formed on the cylindrical side wall 166 of the recessed region 164 of the housing 52 and surface 172 of clutch mounting flange 170, respectively. The clutch plates 156 may be slid axially relative to the stem 100 and housing 52, but are prevented from rotating relative to the housing or the stem, depending on which component the clutch plates are splined. The torque transfer path through the constant velocity joint 50 travels from the spline 88 located in the bore 86 of the inner bearing race 54, through torque transmitting balls 56 to housing 52, at which point the torque is transmitted to the clutch plate 156 splined at the outer diameter to the housing 52, across the clutch plate interface to the adjoining clutch plate 156 that is splined at the inner diameter to the stem, and ending at the spline 117.

The fastener 178 may be utilized to set a torque threshold of the clutch pack 118. When the fastener 178 is tightened, the compression force being applied by the housing 52 and the stem 100 on the clutch pack 118 increases, thereby producing a corresponding increase in the torque threshold. Conversely, loosening the fastener 178 reduces the compression on the clutch pack 118, and the corresponding torque threshold is reduced. The biasing member 154 disposed between the head 186 of the fastener 178 imparts a generally constant axial compressive load on the clutch plates 156 of the clutch pack 118. The fastener 178 may be installed and pre-tensioned prior to assembly of the inner bearing race 54 into the housing 52. The fastener 178 tension may also be set through the inner joint bore 86 after assembly.

The clutch pack 118 is disposed within the clutch chamber 176 and engages the outer race stem 100 and the housing 52. The clutch pack 118 is configured such that the outer race stem 100 and the housing 52 rotate in unison below a pre-set overload torque value. When the overload torque reaches a predetermined threshold, the designed frictional resistance of the plurality of slip clutch plates 156 is overcome and independent rotation is allowed. Once the overload torque value threshold is crossed, the outer race stem 100 and the housing 52 are allowed to rotate independently, thereby preventing damaging torque from being imparted into the constant velocity joint 50 internal components. When the torque values drop below the overload threshold, the clutch pack 118 re-engages and the outer race stem 100 and housing 52 resume rotating in unison.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously or generally simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A constant velocity joint comprising:
   a housing defining a bearing cavity;
   a bearing disposed within the bearing cavity;
   a stem rotatably connected to the housing;
   a clutch pack disposed between the housing and the stem;
   a fastener connecting the housing to the stem, the fastener at least partially disposed within the bearing cavity, wherein the housing slidably engages the fastener; and
   a biasing member disposed within the bearing cavity, the biasing member disposed between the fastener and the housing,
   wherein the fastener is fixedly attached to the stem and the biasing member generates a biasing force urging the housing and the stem into engagement with the clutch pack.

2. The constant velocity joint of claim 1, wherein the housing is rotatable about the fastener.

3. The constant velocity joint of claim 1, wherein the bearing includes an inner joint bore through which the fastener is accessible from outside of the housing.

4. The constant velocity joint of claim 3, wherein the inner joint bore includes a spline.

5. The constant velocity joint of claim 1, wherein the fastener threadably engages the stem.

6. A constant velocity joint comprising:
   a housing defining a bearing cavity, the housing including a first cylindrical region and a second cylindrical region having a longitudinal axis substantially coinciding with a longitudinal axis of the first cylindrical region;
   a bearing disposed within the bearing cavity, a longitudinal axis of the bearing substantially coinciding with the longitudinal axis of the first and second cylindrical regions of the housing;
   a stem including a third cylindrical region and a fourth cylindrical region having a longitudinal axis substantially coinciding with a longitudinal axis of the third cylindrical region, the third cylindrical region slidably engaging the first cylindrical region of the housing;

a clutch pack disposed between the housing and the stem and engaging the second cylindrical region of the housing and the fourth cylindrical region of the stem; and a fastener fixedly attached to the stem and rotatably engaging the housing; and a biasing member disposed between the fastener and the housing, the biasing member urging the housing and the stem into engagement with the clutch pack.

7. The constant velocity joint of claim 6, wherein the clutch pack includes an outer circumference that engages the second cylindrical region of the housing and an inner circumference that engages the fourth cylindrical region of the stem.

8. The constant velocity joint of claim 6, wherein the clutch pack includes an outer circumference engaging the fourth cylindrical region of the stem and an inner circumference engaging the second cylindrical region of the housing.

* * * * *